United States Patent [19]

Chiou et al.

[11] Patent Number: 4,863,990
[45] Date of Patent: Sep. 5, 1989

[54] MODIFIED SOLUTION POLYMERS FOR COATINGS, FILMS, MASTICS, CAULKS, AND ADHESIVES

[75] Inventors: Shang-Jaw Chiou, Lower Gwynedd; Donald A. Winey, Warminster, both of Pa.

[73] Assignee: Rohm and Haas Company, Del.

[21] Appl. No.: 133,662

[22] Filed: Dec. 16, 1987

Related U.S. Application Data

[63] Continuation-in-part of Ser. No. 836,379, Mar. 5, 1986, abandoned.

[51] Int. Cl.$^4$ .................. C08L 37/00; C08L 51/00
[52] U.S. Cl. .................... 524/517; 524/521; 524/522; 524/525; 524/526; 524/529; 524/533; 524/534
[58] Field of Search .............. 524/517, 521, 522, 525, 524/526, 529, 533, 534

[56] References Cited

U.S. PATENT DOCUMENTS

| | | | |
|---|---|---|---|
| 4,033,920 | 7/1977 | Isozaki et al. | 260/29.6 H |
| 4,327,005 | 4/1982 | Ramlow et al. | 524/529 |
| 4,350,780 | 9/1982 | Van Clieve et al. | 521/137 |
| 4,461,870 | 7/1984 | Kanda et al. | 525/123 |
| 4,529,765 | 7/1985 | DenHartog et al. | 524/294 |
| 4,598,111 | 7/1986 | Wright et al. | 524/40 |

FOREIGN PATENT DOCUMENTS

| | | | |
|---|---|---|---|
| 159155 | 9/1984 | Japan | 524/533 |
| 1221899 | 2/1971 | United Kingdom . | |

*Primary Examiner*—Paul R. Michl
*Assistant Examiner*—Patrick A. Doody
*Attorney, Agent, or Firm*—Carl W. Battle

[57] ABSTRACT

Modified solution polymer compositions useful for films, coatings, caulks, adhesives, and mastics having advantitious properties such as low surface tack, short drying time, high tensile strength, and hardness, uses of such compositions, and processes for preparing them are disclosed.

16 Claims, No Drawings

4,863,990

MODIFIED SOLUTION POLYMERS FOR COATINGS, FILMS, MASTICS, CAULKS, AND ADHESIVES

This application is continuation-in-part of application Ser. No. 836,379 filed Mar. 5, 1986, now abandoned.

BACKGROUND OF THE INVENTION

1. Field of the Invention

This invention relates to film-forming polymer compositions used in the coatings, mastics, adhesives, caulks and film field.

2. Description of the Prior Art

Film-forming solution polymer compositions are well known in the coatings, adhesives, caulks, and mastics fields. Recently it has been suggested to modify film-forming polymer solutions with insoluble reinforcing polymeric particles wherein said particles ae separately prepared, and are based on different polymer compositions from the film-forming polymer itself. For example, Kanda et al, U.S. Pat. No. 4,461,870, discloses film-forming polymer having functional groups capable of reacting with a crosslinking agent, an organic diluent for said polymer and crosslinking agent and, separately-prepared, insoluble polymer microparticles ("microgels") composed of a crosslinked copolymer of alpha, beta ethylenically unsaturated monomers, said microparticles carrying a resinous portion, different from said film-forming polymer, having an amphoionic group of the formula —N—R—Y where R is alkylene or phenylene and Y is —COOH or —SO$_3$H. The Kanda et al systems are useful for high solids coating compositions. The Kanda et al objective is to provide microparticles of polymer that are easily prepared without using any harmful emulsifier or stabilizing agent and are directly added to a coating composition as they are.

One disadvantage to the Kanda et al systems and other prior art polymeric reinforcing particle systems is the requirement of separate preparation and isolation of such particles. Another disadvantage is the requirement of a specialized amphoionic stabilizer which would increase the water-sensitivity.

U.S. Pat. No. 4,529,765 discloses a coating composition comprising a solvent and a binder containing an ethylenically-unsaturated acrylic polymer and an amino acrylic polymer. The '765 patent does not teach or suggest particle-reinforced solution polymer compositions wherein the reinforcing particles are prepared in situ and chemically grafted to the solution polymer.

U.S. Pat. No. 4,598,111 discloses coating compositions containing a soluble film forming synthetic resin, an organic solvent, and insoluble, emulsion-polymerized polymer microparticles. The '111 patent involves separate preparation and isolation of the polymer microparticles and does not teach or suggest in situ preparation of the polymer microparticles and chemical grafting of said microparticles to the soluble resin.

SUMMARY OF THE INVENTION

Therefore, an objective of this invention is to avoid the separate preparation of polymeric reinforcing particles and to provide an in situ preparation method which also avoids the amphoionic stabilizer.

Another objective is to prepare microgel particle-containing, film-forming polymers wherein said microgel particles are chemically grafted to said film-forming polymers for improved coating, film, mastic, and adhesive compositions.

Another objective is to provide microgel-particle containing film-forming solution polymer systems having improved stability, compatibility, ease of blending, acceptance of wide range of solvent types, and usable without isolation from non-compatible reaction mixtures.

These objects, and others as will become apparent from the following disclosure, are achieved by the present invention which is, in one aspect, a composition comprising film-forming polymer dissolved in organic solvent, said film-forming polymer containing reactive functionality which is either ethylenic unsaturation or is other than ethylenic unsaturation, and insoluble reinforcing particles dispersed in said solution which are the reaction product of a system comprising (a) polyethylenically unsaturated monomer, (b) a portion of said film-forming polymer and, when said reactive functionality is other than ethylenic unsaturation, (c) a linking monomer which contains both ethylenic unsaturation and a group reactive with said reactive functionality.

In another aspect, the invention is the cured films having low surface tack, short drying time, high tensile strength, and high film hardness dried from the aforementioned composition. The composition is also used for coatings, roof mastics, adhesives, and caulks having improved properties according to the invention. The process for preparing these compositions is quite unique and is part of the invention.

DETAILED DESCRIPTION OF THE INVENTION AND THE PREFERRED EMBODIMENTS

The film-forming polymer constituent of the invention is, of course, soluble in organic solvent and, as mentioned above, contains reactive functionality which is either ethylenic unsaturation or is "other than ethylenic unsaturation." Unsaturation which is ethylenic occurs in such film-forming polymers as poly(1,3-butadiene), alkyds, and unsaturated polyesters.

The film-forming polymers are prepared in solution, usually to a number average molecular weight of about 2,500 to 200,000, preferably about 20,000 to 100,000.

The choice of solvent is not critical. Any solvent suitable to the desired end use can be used. Preferred organic solvents can be xylene, toluene, VM & P naphtha, mixtures of aliphalic/aromatic hydrocarbons, hexanes, heptanes, octanes, ether alcohols, ethyl acetate, butyl acetate, methylethyl ketone, methyl isobutyl ketone, and mixtures thereof.

The solvent to polymer ratio can be any which is suitable for the end use. Preferably, the solvent to monomer mix or polymer ratio is about 3/1 to 1/7.

As mentioned above, the reactive functionality can be "other than ethylenic unsaturation," for example hydroxy, carboxy, anhydro, oxyrane, amino, and isocyanato groups. Such functional groups can be introduced by incorporation of a monomer which has both ethylenic and other than ethylenic functionality, such as acrylic acids, hydroxy-containing acrylates, isocyanato acrylates, unsaturated anhydrides, unsaturated epoxides, amines, or other functional groups or combinations thereof.

The balance, preferably up to about 90 percent by weight, of the monomer system which polymerizes and forms the film-forming polymer containing other than ethylenic functionality is monounsaturated and is comprised of methacrylates, acrylates, acrylonitrite, n-vinyl pyrrolidone, styrene, amine-containing monomer, vinyl acetate, vinyl chloride, and vinylidene chloride.

Specific combinations of monomers to form such film-forming polymers, are exemplified by the following examples: (i) butylacrylate, acrylonitrile, and acrylic acid; (ii) butylacrylate, acrylonitrile, and hydroxyethyl methacrylate; (iii) butadiene; (iv) an alkyd; (v) butylacrylate, methyl methacrylate, acrylonitrile, and acrylic acid; (vi) butylacrylate, methyl methacrylate, acrylonitrile, and methacrylic acid; (vii) butyl acrylate and acrylic acid; (viii) butyl acrylate and methacrylic acid; (ix) unsaturated polyester; or (x) butylacrylate, acrylonitrile and maleic anhydride.

In either case, i.e., whether the reactive functionality on the film-forming polymer is ethylenic or other than ethylenic, the invention contemplates reacting part of the film-forming polymer with polyethylenically unsaturated monomer(s) to form, in situ, insoluble reinforcing particles which are chemically grafted to the film-forming polymer. Examples of such polyethylenically unsaturated monomers are dimethacrylates, diacrylates, trimethacrylates, triacrylates, divinyl aromatics, trivinyl aromatics, diacrylamides, and triacrylamides. Specific examples of such monomers are 1,3-butyleneglycol dimethacrylate, ethyleneglycol dimethacrylate, diethyleneglycol dimethacrylate, trimethylolpropane trimethacrylate, trimethylolpropane triacrylate, the adduct of hydroxyethyl methacrylate and meta-tetramethyl xylene diisocyanate, divinyl benzene, and methylene bisacrylamide. In the case where the functionality is other then ethylenic, a "linking monomer" which contains both ethylenic unsaturation and a group reactive with the other-than-ethylenic functional groups is reacted with the film-forming polymer, ether by simple mixing, e.g., in the case of acid-amine reactions, or by adjusting the reaction conditions to cause said reaction, e.g., in the case of isocyanate-hydroxyl or the acid-hydroxyl reaction.

Preparing the reinforcing particles in situ according to the present invention (1) eliminates the necessity of separate preparation and isolation of the reinforcing particles, and (2) eliminates the necessity for special stabilizers (i.e. amphoionic stabilizers which would increase water-sensitivity to stabilize the reinforcing particles, because said particles are stabilized by chemical grating to the soluble, film-forming polymer.

Some suitable linking monomers are allylglycidyl ether, N-methyl-N-(2-hydroxyethyl) linseed oil amide, dimethyaminoethyl methacrylate, and isocyanatoethyl methacrylate, acrylic acid, methacrylic acid, glycidyl acrylate, glycidyl methacrylate, linseed oil fatty acid, linseed oil fatty amine, drying oil amines, linseed oil fatty alcohol, drying oil alcohols, glycidyl drying oil acid esters, N-methyl-N-hydroxyethyl drying oil amides, vinyl benzyl chloride, (meth)acrylol chloride and glycidyl linseed oil fatty ester.

The particles generally comprise about 1 to 70 percent by weight of the entire composition, based on weight of film-forming polymer and particles, and are usually stable gel particles having average diameter of about 30 to 1000 namometers by transmission electron microscopy on stained films.

Surprisingly, the composition can be dried to cured films having low surface tack, short drying time, high tensile strength, high film hardness and improved gloss.

When used as a roof mastic, adhesive, or caulk, the composition imparts improved properties such as increased tensile strength and reduced tack.

The composition also has an advantage with alkyd resins which are used in some cases as the film-forming polymer. It improves their drying time and reverse impact resistance.

The usual catalysts and minor additives can also be used in this invention, as can the additives which are frequently post-added to film-forming polymers.

Other utilities and variation on the preparation of this invention are also contemplated.

Several non-limiting, non-restrictive examples of the invention and comparative embodiments are described below.

EXAMPLE I

Preparation of film-forming polymer, dissolved in organic solvent, containing reactive functionality which is other than ethylenic unsaturation followed by reaction with linking monomer.

A. Preparation of Carboxyl Containing Solution Polymer

A 5-liter four-necked flask equipped with a thermometer, condenser, mechanical stirrer and nitrogen inlet pipe was charged with 259 g. of butyl acrylate, 7 g. of acrylonitrile, 14 g. of acrylic acid ("AA"), 0.06 g. t-butylperbenzoate and 500 g. of xylene. The solution was heated gently to reflux under a nitrogen sweep until polymerization took place. The solution was then maintained at reflux for fifteen minutes, at which point a mixture of monomers (2331 g. butyl acrylate, 63 g. acrylonitrile and 126 g. acrylic acid) and initiator (0.5 g. t-butylperbenzoate in 170 g. xylene) was separately added in a dropwise manner over a period of three hours while the solution was maintained at reflux. The reaction temperature steadily increased to 150° C. during the feed. On completion of the feed, the solution was held at reflux for fifteen minutes. After the hold period, a chaser solution (0.56 g. t-butylperbenzoate in 180 g. xylene) was added dropwise over a period of thirty minutes. The solution was then cooled to 130° C. after the first chase. Residual monomers were finally chased with 2.8 g. t-butylperbenzoate in 10 g. xylene, followed by 10 g. butyl acrylate. The solution was then held at 130° C. for one and a half hours. The solution was cooled, and the resulting solution polymer had 78% total solids and weight average molecular weight $1.09 \times 10^5$, number average molecular weight $1.03 \times 10^4$. The resultant film-forming polymer contains carboxyl functionality.

B. Reacting of MHELA with Carboxyl-Containing Solution Polymer

A 5-liter four-necked flask equipped with a thermometer, Dean-Stark trap topped with a condenser and nitrogen inlet pipe was charged with 3,000 g. of the polymer from Example IA (78% solids), 198 g. of N-methyl-N-hydroxyethyl linseed oil amide solution ("MHELA", 59% active in toluene), and 200 g. of xylene. The MHELA acts as a linking monomer, reacting with the carboxyl groups of the film-forming polymer and providing pendant unsaturation. The solution was heated at 135° C. and the water of the reaction was azeotropically removed with the aid of a nitrogen sparge of house vacuum. After continuous heating for two hours, the reaction was complete. The final solution had 80.3% solids and the Brookfield viscosity at 25° C. was 68,000 cps.

EXAMPLE II

This Example describes preparation of reinforcing particles by reacting polyethylenically unsaturated monomer with a portion of composition comprising film-forming polymer dissolved in organic solvent.

To a 5-liter flask fitted with stirrer, nitrogen inlet pipe, thermometer and condenser were added 2,000 g. of the film-forming polymer from Example IB (total solids 71.4%), 159 g. of 1,3-butylene glycol dimethacrylate ("BGDMA"), and 400 g. of xylene. The solution was heated at 68° C. under a nitrogen sweep. At that temperature, 1.59 g. of VAZO-52 [2,2'-azobis(2,4-dimethyl valeronitrile)] in 25 g. xylene was added. A 3° C. exotherm and a hazy solution were obtained within 30 minutes. After one hour at 68° C., the chaser solution (1.59 g. VAZO-52/25 g xylene) was added. The solution was then held at 68° C. for two hours to complete the process. GLC analysis indicated that BGDMA conversion was 95%. The final hazy composition of the invention had total solids of 61.4%, Brookfield viscosity at 25° C. of 32,500 cps and insoluble reinforcing particles having a size of 700 nm with a polydispersity of 7 (measured in acetone on a Coulter Nanosizer particle size analyzer), a value about three times larger than observed in the dry film by transmission electron microscopy on stained films.

EXAMPLE III

Preparation and Characterization of Additional Examples of the Invention

Example II was repeated, except varying the % of BGDMA, and compared to Example IB and an example substituting monounsaturated methyl methacrylate (MMA) for the polyethylenically unsaturated BGDMA.

The soluble fraction, swell ratio and particle sizes of the compositions are shown in Table 1.

TABLE 1

| | Film-Forming Polymer: 92.5 BA/2.5 AN/5 AA//5 MHELA | | | | |
|---|---|---|---|---|---|
| Un-Saturated Monomer | Total Solids of polymerized composition | Viscosity centipoise | Soluble Fraction | Swell Ratio | Particle Present and % Insoluble |
| None* | 58.8 | 6,600 | 99.5 | — | no/0 |
| 10 MMA* | 57.3 | 7,900 | 99.0 | — | no/0 |
| 3 BGDMA | 61.9 | 13,800 | 96.0 | 2.9 | yes/4 |
| 5 BGDMA | 59.6 | 11,200 | 93.0 | 11.7 | yes/7 |
| 10 BGDMA | 61.3 | 35,500 | 82.0 | 6.2 | yes/18 |
| 20 BGDMA | 50.7 | 55,000 | 73.0 | 6.5 | yes/27 |

*Comparative
Note: Soluble fraction and swell ratio measured in acetone.

EXAMPLE IV

This Example describes preparation of composition comprising film forming polymer, dissolved in organic solvent, containing reactive functionality other than ethylenic unsaturation, and reinforcing particles which are the reaction product of a monomer system comprising polyethylenically unsaturated monomer, a portion of said film-forming polymer, and a linking monomer which contains both ethylenic unsaturation and a group reactive with said reactive functionality.

A 3-liter, four-necked, flask equipped with a thermometer, condenser, mechanical stirrer and nitrogen inlet tube was charged with 725 g. of a 44.4% solids in xylene solution of the film-forming polymer of Example IA, containing acid reactive functionality, 30.4 g. of BGDMA polyethylenically unsaturated monomer, and 5.4 g. of N,N-dimethylaminoethyl-methacrylate ("DMAEMA") linking monomer which contains both ethylenic unsaturation and a group reactive with the reactive acid functionality of the film-forming polymer. The solution was heated at 95° C. under a nitrogen sweep. At that temperature, 0.36 g of VAZO-52 in 2 g xylene was added. A slightly hazy solution was obtained within one minute. The solution was held at 95° C. for thirty minutes, and then cooled to 80° C. The chaser solution (0.36 g VAZO-52/2 g xylene) was added, and the solution was held at 80° C. for one hour. The final solution had total solids of 48.9%, Brookfield viscosity at 25° C. of 30,000 cps, a particle size of 224 nm, and a polydispersity of 5 (measured in acetone, using a Nanosizer.)

EXAMPLE V

Preparation of Compositions of Invention using Allyl GlycidylEther to Provide Ethylenic Unsaturation in Film-Forming Polymer To a 1-liter, four-necked flask equipped with mechanical stirrer, condenser, thermometer and nitrogen inlet tube was charged 100 g. of the acrylic acid containing film-forming polymer prepared in Example IA (total solids: 77.6%), 0.61 g. of allyl glycidyl ether linking monomer which reacts to add ethylenic unsaturation, and 0.12 g. of N,N-dimethylaminoethanol ("DMAE") as catalyst. The solution was heated at 120° C. for 2 hours. The solution was then cooled until the solution temperature dropped to 95° C. To the film-forming polymer, now containing pendent ethylenic unsaturation, was added 8.6 g. of BGDMA polyethylenically unsaturated monomer followed by 0.086 g. VAZO-52 in 2 g. xylene. The mixture was held at 95° C. for 30 minutes and then cooled at 80° C. A chaser solution (0.086 g. VAZO 52/2 g. xylene) was then added. To complete the reaction, the solution was then held at 80° C. for one hour. The final product was diluted with 66 g. of xylene to a total solids at 48.1%; Brookfield viscosity at 25° C. of 4,200 cps and particle size of 367 nm and polydispersity of 3.

EXAMPLE VI

Use of Isocyanatoethyl Methacrylate as Linking Monomer

To a 500-ml. four-necked flask equipped with mechanical stirrer, condenser, thermometer and nitrogen inlet tube was charged 135 g. of a solution polymer of the composition 95 BA/2.5 AN/2.5 HEMA prepared by the method of Example IA (total solids: 75.2%), 0.2 g. of isocyanatoethyl methacrylate, 11.3 g. of BGDMA and 70 g. of xylene. The solution was heated at 80° C. To this solution was then added two drops of dibutyltin dilaurate and the solution was maintained at 80° C. for one hour. The solution was cooled to 68° C. and, at that temperature, 0.1 g. of VAZO-52 in 2 g. xylene was added. After one hour at 68° C., the chaser solution (0.1 g. VAZO-52/2 g. xylene) was added. The solution was then held at 68° C. for two hours to complete the process. The final solution polymer had total solids at 53.6%, Brookfield viscosity at 25° C. of 445 cps and a particle size and polydispersity of 247 nm and 3, respectively.

second stage and polymer blends also can be seen in Table 2.

TABLE 2

| | | First Stage Polymer: 92.5 BA/2.5 AN/5 AA//5 MHELA | | | |
|---|---|---|---|---|---|
| | | 75° F. Properties | | 0° F. Properties | |
| From Example | Unsaturated Monomer | Tensile Strength (psi) | Elongation % | Tensile Strength (psi) | Elongation % |
| IB | *0 | 33 | 190 | 412 | 560 |
| II | *10 MMA | 55 | 180 | 441 | 490 |
| II | 10 BGDMA | 127 | 330 | 951 | 440 |
| II | 20 BGDMA | 400 | 340 | 1360 | 360 |

*Comparative

EXAMPLE VII

This Example describes use of polybutadiene as film-forming polymer containing ethylenic unsaturation and BGDMA as polyunsaturated monomer.

To a 500-ml. four-necked flask equipped with mechanical stirrer, condenser, thermometer and nitrogen inlet tube was charged 100 g. of polybutadine (Arco Poly BD R45HT; 100%), 4.2 g. BGDMA and 50 g. xylene. The solution was heated at 90° C. under a nitrogen sweep. At that temperature, 0.04 g. of VAZO-52 in 2 g. xylene was added. After 30 minutes the solution was cooled to 70° C. and held at that temperature for one and a half hours. The resulting solution polymer had 68.6% total solids and the Brookfield viscosity at 25° C. was 280 cps; particle size of 240 nm and polydispersity of 2 (measured in hexane).

EXAMPLE VIII

Comparison of Polyunsaturated Monomer Modified Solution Polymer With Usual Second Stage and Polymer Blend Systems Films were prepared by the following procedure with and without particles from polyunsaturated monomer, and using MMA as a comparative second stage. To the solution polymer of Example IB or II (10.7 g. of solids), 0.32 g. of pentaerythritol tetra (3-mercaptopropionate) ("PETMP") was added 2.15 g. of a 2% vanadyl acetylacetone catalyst in xylene solution (hereinafter referred to as VOMA cure). Films are prepared by casting 10-15 g. (about 6 g. dry weight) of this mixture in 10 cm polymethylpentane petri dishes and allowing the solution to dry/cure on a level surface. After curing 4-7 days at ambient conditions the film was lightly talced and strips cut for determination of tensile strength and elongation. Mechanical properties were determined at room temperature at a crosshead speed of 0.2 inches per minute.

As indicated in Table 2, the film's toughness, as represented by tensile strength, increased proportionally with the BGDMA particles. The superiority of the BGDMA particle modified sample vs. MMA as the

EXAMPLE IX

Comparision of Polyunsaturated Monomer Modified Polymer with Hard First Stage Polymer As indicated in Table 3, the tensile strength of the films increased as the polymer Tg increases. However, the low temperature flexibility of the films begins to fall at the point that the mechanical properties beging to build. Therefore, a good balance of properties is not obtained by simply increasing the Tg of the polymer. Films were cured by the procedure of Ex. VIII.

TABLE 3

| Sample | Prepared by Process of Example | First Stage BA/MMA/AN/ AA/MHELA | Polyethylenically Unsaturated Monomer (% BGDMA) | Calculated[2] Tg (°C.) |
|---|---|---|---|---|
| A* | IB | 92.5/—/2.5/5.0//5.0 | 0 | −42 |
| B* | IB | 82.5/10/2.5/5.0//5.0 | 0 | −37 |
| C* | IB | 72.5/20/2.5/5.0//5.0 | 0 | −25 |
| D* | IB | 52.5/40/2.5/5.0//5.0 | 0 | 0 |
| E* | IB | 37.5/55/2.5/5.0//5.0 | 0 | +24 |
| F | II | 92.5/—/2.5/5.0//5.0 | 10 · | −42 |
| G | III | 92.5/—/2.5/5.0//5.0 | 20 | −42 |

| Sample | Prepared by Process of Example | Mandrel Bend Flexibility (−15° F.) | Tensile Strength[1] (psi) | Elongation[1] (%) |
|---|---|---|---|---|
| A* | IB | Pass at 180° | 30 | 220 |
| B* | IB | Pass at 180° | 40 | 240 |
| C* | IB | Fail at 2" | 56 | 360 |
| D* | IB | Fail at 4" | 248 | 650 |
| E* | IB | Fail at 4" | 251 | 650 |
| F | II | Pass at 180° | 98 | 370 |
| G | III | Pass at 180° | 391 | 310 |

*Comparative
[1]Films were cured by VOMA Chemistry as described in Example VIII.
[2]Of the first stage polymer before MHELA modification.

EXAMPLE X

Effect of Various Cures

As indicated in Table 4, the tensile strength increases as BGDMA increases with four types of curing. The elongation increases with BGDMA in VOMA and oxidative curing, while the elongation decreases slightly with BGDMA in ionic and ionic/oxidative curing.

TABLE 4

| | First Stage: Polymer of Example IB | | | | | |
|---|---|---|---|---|---|---|
| | Unmodified[1] | | 10 BGDMA[2] | | 20 BGDMA[2] | |
| Cure Mechanism | Tensile Strength (psi) | Elong. (%) | Tensile Strength (psi) | Elong. (%) | Tensile Strength (psi) | Elong. (%) |
| VOMA cure of Ex. VIII | 32 | 200 | 146 | 370 | 362 | 430 |
| Ionic (Zn) | 77 | 1220 | 221 | 830 | 234 | 800 |
| Oxidative (Co) | 23 | 145 | 72 | 410 | 269 | 470 |

TABLE 4-continued

| | First Stage: Polymer of Example IB | | | | | |
|---|---|---|---|---|---|---|
| | Unmodified[1] | | 10 BGDMA[2] | | 20 BGDMA[2] | |
| Cure Mechanism | Tensile Strength (psi) | Elong. (%) | Tensile Strength (psi) | Elong. (%) | Tensile Strength (psi) | Elong. (%) |
| Ionic & Oxidative | 324 | 800 | 499 | 710 | 800 | 450 |

[1]Comparative
[2]Polymers of Example III

EXAMPLE XI

Modification of Alkyd Film-Forming Polymer With BGDMA, Polyethylenically Unsaturated Monomer To a 500 ml. flask fitted with stirrer, nitrogen inlet pipe, thermometer and condenser were added 189.2 g. of Cargill 5070 alkyd polymer (available from Cargill Inc., total solids 70%) and 14.9 g. of BGDMA. The solution was heated to 95° C. under a nitrogen sweep. At that temperature, 0.15 g. of VAZO-52 in 2 g. xylene was added. The solution was held at 95° C. for thirty minutes, and then cooled to 80° C. The chaser solution was added (0.15 g. VAZO-52/2 g. xylene), and the solution was held at 80° C. for 30 minutes. Second chaser solution was then added (0.15 g. VAZO-52/2 g. xylene), and the solution was held at 80° C. for one hour to complete the process. The final solution polymer had total solids at 72.5%, and Brookfield viscosity at 25° C. of 25,000 cps.

EXAMPLE XII

Modification of Second Alkyd With BGDMA

To a 500-ml flask equipped with stirrer, nitrogen inlet pipe, thermometer and condenser were added 40 g. of Aroplaz 6440 alkyd polymer (available from Spencer-Kellog, Division of Textron Inc., 85% total solids), 51 g. of BGDMA and 128 g. of heptane. After holding at 90° C. for 15 minutes, the contents were cooled to 80° C. The reaction was chased with 0.51 g. VAZO-52/3 g. xylene, and held at 80° C. for 30 minutes, then cooled to 70° C., chased with 0.51 g. VAZO-52/3 g. xylene, and then held at 70° C. for an hour and a half to complete the process.

EXAMPLE XIII

Comparision of Particle-Modified Alkyds of Invention Versus Simple MMA and Vinyl Toluene-Modified Alkyds As shown by the data in Table 5, the particle-modified alkyds provide a much better balance of properties in pigmented formulations than the simple MMA, vinyl toluene or B-67 blend systems. Much better impact resistance was seen in the particle-modified alkyd than the B-67 alkyd blend system.

TABLE 5

| | | Formulations of Pigmented System | | | (6 days at 140° F.) Impact Resistance (in-lb.) | |
|---|---|---|---|---|---|---|
| Sample | Composition | Zapon Tack (0 grams)[3] | Zapon Tack (500 grams)[3] | Thumb Twist[3] | Direct | Reverse |
| H.* | Aroplaz 6440[1] | 4 | 8 | 8 | 120 | 100 |
| I.* | 80 Aroplaz 6440/20 B-67[2] | 3 | 6 | 7 | 20 | 4 |
| J.* | 85 Aroplaz 6440/15 (90 m MA/10 DMAEMA) | 3.5 | 8 | 8 | 100 | 100 |
| K.* | 85 Aroplaz 6440/15 (90 VT/10 DMAEMA) | 3.5 | 8 | 8 | 120 | 100 |
| L. | 85 Aroplaz 6440/15 (90 BGDMA/10 DMAEMA) | 2.5 | 5 | 4.5 | 75 | 30 |
| M. | 85 Aroplaz 6440/15 (85 BGDMA/15 DMAEMA) | 2.5 | 5 | 4.5 | 80 | 70 |

*Comparative
[1]Aroplaz 6440 is a medium oil alkyd.
[2]B-67 is an amine-containing acrylic solution polymer from Rohm and Haas Co. designed as an alkyd modifier.
[3]Values in table are hours to pass. Thumb twist measures through-cure of the coating.

EXAMPLE XIV

Particle-modified alkyds within the scope of this invention were compared to unmodified and B-67 modified materials in Table 6.

TABLE 6

| | Formulated Alkyd Enamels | | | | | | | |
|---|---|---|---|---|---|---|---|---|
| | | | ICI Viscosity | Zapon tack | | Tukon Hardness (3 wks.) | Impact Resistance (in-lbs.) | |
| Sample | Binder | % Solids | (centipose) | 0 grams | 500 grams | KHN | Direct | Reverse |
| N* | Cargill 5070 | 63 | 190 | 7 | >8 | 0.89 | >120 | >120 |
| O* | 80 (Cargill 5070)/20(B67) | 55 | 140 | 2.75 | 6.5 | 1.56 | 50 | 10 |
| P | 1046 | 63 | 260 | 4 | 6 | 1.56 | >120 | 110 |
| Q | 1049 | 63 | 160 | 4.5 | 8 | 1.39 | >120 | 110 |
| R* | Aroplaz 6440* | 65 | 140 | 4 | 8 | 1.00 | >120 | 120 |
| S* | 80 (Aroplaz (6440)/20(B67) | 61 | 230 | 2.25 | 4.5 | 1.21 | 16 | <2 |
| T | 1055A | 65 | 360 | 2.25 | 4.5 | 2.06 | 50 | 6 |

TABLE 6-continued

| | | Formulated Alkyd Enamels | | | | | |
|---|---|---|---|---|---|---|---|
| | | | ICI Viscosity | Zapon tack | | Tukon Hardness (3 wks.) | Impact Resistance (in-lbs.) |
| Sample | Binder | % Solids | (centipose) | 0 grams | 500 grams | KHN | Direct | Reverse |
| U | 1055B | 65 | 430 | 2.25 | 4.5 | 2.06 | 60 | 8 |

Cargil 5070 is a long oil alkyd; Aroplaz 6440 is a high molecular weight, medium oil alkyd.
B-67 is an alkyd modifier from Rohm and Haas Co.
1046 is 85 (Cargill 5070)//15(90 BGDMA/10 DMAEMA)
1049 is 90 (Cargill 5070)//10 BGDMA
1055A is 85 (Aroplaz 6440)//15(90 BGDMA/10 DMAEMA)
1055B is 85 (Aroplaz 6440)//15(85 BGDMA/15 DMAEMA)
*Comparative

EXAMPLE XV

BGDMA Modified Alkyd as the Alkyd Modifier

In this example, the particle-modified alkyds were used as the alkyd modifier in place of the B-67. The properties are listed below.

The particle-modified alkyd modifier of the invention provides excellent reverse impact resistance with drying time comparable to the B-67 blend system.

TABLE 7

| Binder | Additive | Drying Time (500 grams) | Reverse Impact (in-lb.) |
|---|---|---|---|
| 100 Aroplaz 6440 | None* | 8 hrs. | 100 |
| 80 Aroplaz 6440 | 20 B-67* | 7.5 hrs. | 4 |
| 80 Aroplaz 6440 | 20 (60 Aroplaz 6440/40 BGDMA) | 7.5 hrs. | 100 |
| 80 Aroplaz 6440 | 20 (40 Aroplaz 6440/60 BGDMA) | 7.5 hrs. | 100 |

*Comparative
Note: Drying Time is measured as time required to pass Zapon Tack (500 grams)

EXAMPLE XVI

A composition was prepared without pendant ethylenic unsaturation in the film-forming polymer as described below. A 500-ml, four-necked flask equipped with a thermometer, condenser, mechanical stirrer and nitrogen inlet tube was charged with 100 g. of solution polymer (92.5 parts butyl acrylate, 2.5 parts acrylonitrile, and 5 parts acrylic acid at 73.7% solids) and 100 g. of xylene. This solution was heated to 95° C. under a nitrogen sweep. Then 8.2 g. of BGDMA was added, followed by 0.009 g. of VAZO-52 in 2 g. of xylene. A hazy solution was formed within ten minutes and many large, suspended particles were noticed. The solution was held at 95° C. for 30 minutes and then cooled to 80° C. A chaser (0.009 g. VAZO-52 in 2 g. xylene) was added and the solution was maintained at 80° C. for one hour. The final product was a mixture of solution polymer and many visible, large (>1 micron) particles of poly-BGDMA, which settled out from the solution after standing.

EXAMPLE XVII

Modified alkyd polymer (Sample Z) within the scope of this invention was prepared as in Example XII, with a weight ratio of alkyd to BGDMA of 92.5 to 7.5 and a total solids of 57.8%.

For comparative purposes, a dispersion of polymeric micro particles was prepared as described in Example 1 of U.S. Pat. No. 4,598,111. This dispersion had a total solids of 20.2% and average particle size of 67 nm. A particle-modified alkyd polymer composition was prepared by mixing the above dispersion with an alkyd resin as used in Example XII. The weight ratio of microparticle dispersion to alkyd was 7.5 to 92.5. The final mixture (Sample Y) had a total solids of 68.5%.

The two modified-alkyd compositions prepared above were tested for gloss and drying rate and compared to a control (Sample X) consisting of the unmodified alkyd. The results are presented in Table 8 and demonstrate that the particle-modified alkyd composition of this invention (Sample Z) has a dramatically improved drying time in comparision to the control (Sample X) and the prior art composition (Sample Y). The composition of the present invention also has improved gloss over the prior art composition.

TABLE 8

| | Gloss | | Drying Time (hours) |
|---|---|---|---|
| Sample | 20° | 60° | (Zapon-500 grams) |
| X (control) | 108 | 135 | >24 |
| Y (comparative) | 50 | 96 | >24 |
| Z | 108 | 133 | 8 |

We claim:
1. A composition comprising
   (1) a solution of film-forming polymer dissolved in organic solvent, said film-forming polymer containing reactive functionality which is either ethylenic unsaturation or is other than ethylenic unsaturation, and
   (2) insoluble polymeric reinforcing particles having an average diameter of about 30 to 1000 nanometers and which are dispersed in said solution wherein said reinforcing particles are chemically grafted to said film-forming polymer and are the in situ reaction product of a system comprising, (a) polyethylenically unsaturated monomer, (b) a portion of said film-forming polymer and, (c) when said reactive functionality is other than ethylenic unsaturation, a linking monomer which contains both ethylenic unsaturation and a group reactive with said reactive functionality.

2. The composition of claim 1 wherein said polyethylenically unsaturated monomer is selected from dimethacrylates, diacrylates, trimethacrylates, triacrylates, divinyl aromatics, trivinyl aromatics, diacrylamides, and triacrylamides.

3. The composition of claim 1 wherein said polyethylenically unsaturated monomer is selected from the group consisting of 1,3-butyleneglycol dimethacrylate, ethyleneglycol dimethacrylate, diethyleneglycol dimethacrylate, trimethylolpropane trimethacrylate, trimethylolpropane triacrylate, the adduct of hydroxyethyl methacrylate and meta-tetramethyl xylene diisocyanate, divinyl benzene, and methylene bisacrylamide.

4. The composition of claim 1 wherein said reactive functionality is pendant ethylenic unsaturation.

5. The composition of claim 1 wherein said reactive functionality is other then ethylenic unsaturation and is selected from hydroxy, carboxy, anhydro, oxyrane, amino, and isocyanato groups.

6. The composition of claim 1 wherein said organic solvent is selected from the group consisting of xylene, toluene, VM & P naptha, mixtures of aliphalic/aromatic hydrocarbons, hexanes, heptanes, octanes, ether alcohols, ethyl acetate, butyl acetate, methylethyl ketone, methyl isobutyl ketone, and mixtures thereof.

7. The composition of claim 1 wherein said linking monomer is selected from the group consisting of allylglycidyl ether, N-methyl-N-(2-hydroxyethyl) linseed oil amide, dimethylaminoethyl methacrylate, and isocyanatoethyl methacrylate, acrylic acid, methacrylic acid, glycidyl acrylate, glycidyl methacrylate, linseed oil fatty acid, linseed oil fatty amine, linseed oil fatty alcohol, drying oil amine, drying oil alcohol, glycidyl drying oil acid esters, N-methyl-N-hydroxyethyl drying oil amides, vinyl benzyl chloride, (meth)acrylol chloride and glycidyl linseed oil fatty ester.

8. The composition of claim 1 wherein said monomer system comprises at least about 10 percent by weight polyunsaturated monomer and up to 90 percent by weight monounsaturated monomer.

9. The composition of claim 8 wherein said monounsaturated monomer is selected from the group consisting of methacrylates, acrylates, acrylonitrite, n-vinyl pyrrolidone, styrene, amine-containing monomer, vinyl acetate, vinyl chloride, and vinylidene chloride.

10. The composition of claim 1 wherein said solution polymer is a polymer of (i) butylacrylate, acrylonitrile, and acrylic acid; (ii) butylacrylate, acrylonitrile, and hydroxyethyl methacrylate; (iii) butadiene; (iv) an alkyd; (v) butylacrylate, methyl methacrylate, acrylonitrile, and acrylic acid; (vi) butylacrylate, methyl methacrylate, acrylonitrile, and methacrylic acid; (vii) butyl acrylate and acrylic acid; (viii) butyl acrylate and methacrylic acid; (ix) unsaturated polyester; or (x) butyl acrylate, acrylonitrile, and maleic anhydride.

11. Composition of claim 1 wherein said particles comprise about 1 to about 70 percent by weight of said composition.

12. Cured films having low surface tack, short drying time, high tensile strength, and high film hardness dried from the composition of claim 1.

13. Use of the composition of claim 1 as a roof mastic.

14. Use of the composition of claim 1 to improve the drying time of alkyd resins.

15. Use of compositions of claim 1 to improve the reverse impact resistance of alkyd resins.

16. Process of preparing the composition of claim 1 comprising reacting said polyethylenically unsaturated monomer (a) with a portion of said film-forming polymer (b) so as to form a stable composition comprising said reinforcing particles and a solution of said film-forming polymer in organic solvent.

* * * * *